United States Patent [19]

Waterman

[11] 3,867,992
[45] Feb. 25, 1975

[54] LOAD TRANSFERRING HITCH FOR A VEHICLE

[75] Inventor: Donald H. Waterman, Poland, Maine

[73] Assignee: Valley Engineering, Inc., Gray, Maine

[22] Filed: Mar. 7, 1973

[21] Appl. No.: 338,827

Related U.S. Application Data

[60] Continuation-in-part of Ser. No. 190,362, Oct. 18, 1971, Pat. No. 3,768,583, which is a division of Ser. No. 859,945, Sept. 22, 1969, Pat. No. 3,652,106.

[52] U.S. Cl............. 180/14 B, 180/53 D, 280/420, 280/499
[51] Int. Cl.......................................... B62d 53/00
[58] Field of Search ................ 280/499; 180/14, 9.4

[56] References Cited
UNITED STATES PATENTS

| | | | |
|---|---|---|---|
| 1,397,053 | 11/1921 | Mitchell | 180/9.4 X |
| 1,601,245 | 9/1926 | Fornaca | 280/499 X |
| 2,219,533 | 10/1940 | Ross | 180/14 B |

Primary Examiner—Leo Friaglia

[57] ABSTRACT

A hitch for a vehicle such as a track tractor, wheeled tractor or the like for attachment to a device to be drawn by the vehicle such as a snow roller, harrow or other drawn implement or towed load which does not interfere with manual or power steering of the vehicle by the customary steering devices and which, at the option of the operator, may be used to assist him in steering and also to steer the vehicle without using the customary manual or power steering devices. The preferred embodiment of the hitch also includes means by which the pressure of the device which is being drawn upon the surface of the earth, a snow surface or the like, may be varied to increase or decrease the effectiveness of the device in assisting in steering the vehicle with the manual or power steering devices or in steering the vehicle without using the customary steering devices. The hitch is also designed to accommodate power driven shafts to transmit power from the vehicle transmission to drive the device which is being drawn, which are so positioned relative to the vehicle and to the elements of the hitch that the need for universal joints and the like are eliminated.

3 Claims, 9 Drawing Figures

3,867,992
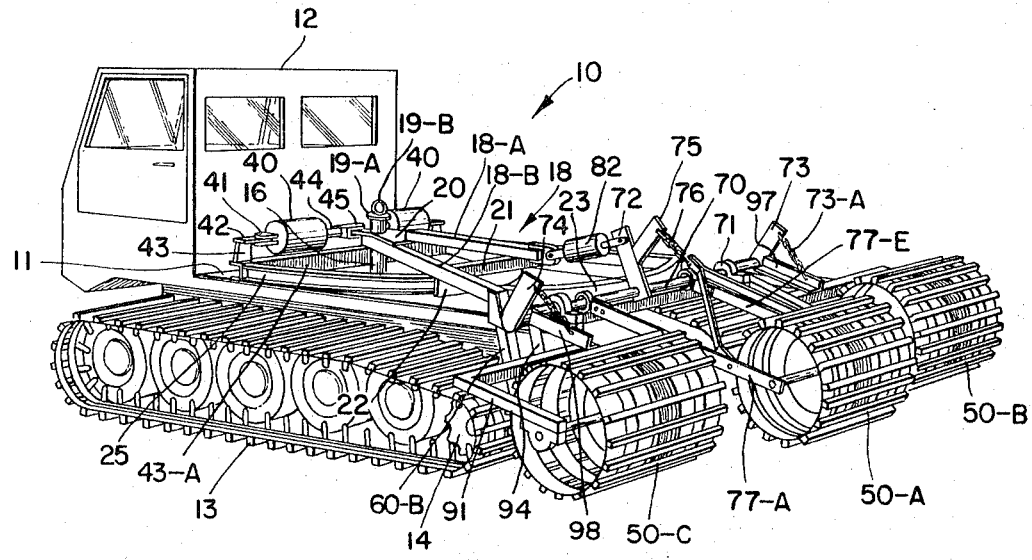
FIG. 1
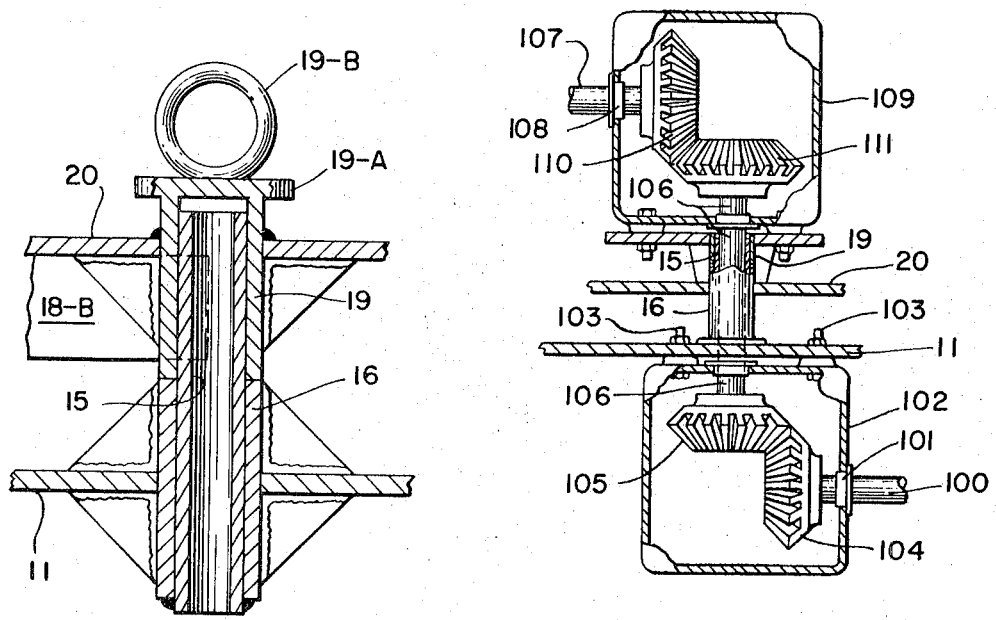
FIG. 5
FIG. 6

LOAD TRANSFERRING HITCH FOR A VEHICLE

This application is a continuation-in-part of my co-pending application Ser. No. 190,362, filed Oct. 18, 1971 and now U.S. Pat. No. 3,768,583 issued Oct. 31, 1973 which is a division of my application Ser. No. 859,945, filed Sept. 22, 1969, now U.S. Pat. No. 3,652,106 issued Mar. 28, 1972.

The steering functions of the hitch are accomplished by locating a substantially vertical pivot on the vehicle substantially at the center of draft of the vehicle, by providing a forward hitch frame member with its forward end mounted for rotation about the vertical pivot and by providing means for guiding this forward hitch frame member for rotation about the vertical pivot in a plane which is substantially normal to the axis of the vertical pivot. Furthermore, with a one point hitch for example, the device to be drawn is attached to an extension of the forward hitch frame at a point which is in a plane which substantially conicides with the axis of the vertical pivot and with a line which extends rearwardly from the axis of the vertical pivot substantially on the longitudinal centerline of the forward hitch frame member when viewed from the top.

The pressure varying function is accomplished by providing a substantially horizontal pivot means on a rearward extension of the forward hitch frame member in a plane which is substantially normal to said longitudinal centerline of the forward hitch frame member. The device to be drawn is attached to a member which is mounted for rotation about the horizontal pivot means so that the pressure exerted by said device against the surface of the ground, snow or other material with which it is in contact may be varied by rotation of this member about the horizontal pivot means towards and away from such surface.

The transmission of power from the vehicle engine is provided by locating a rotatable vertical shaft in the center of the hollow substantially vertical pivot and driving it by a set of 90° gears one of which is driven by an input shaft from the vehicle transmission and the other of which is attached to the lower end of the vertical shaft. A second pair of ninety degree gears is provided at the upper end of the vertical shaft, one is attached to the upper end of the vertical shaft and the other is attached to the output shaft which is connected to an element for activating the device which is being drawn. No universals joints are used in said vertical shaft, nor in the input shaft, nor in the attachment of the hollow substantially vertical pivot to the vehicle. The output shaft may be located in the aforesaid plane through the axis of the vertical pivot and the longitudinal centerline of the forward hitch frame member so it remains in or parallel to the line of draft when the vehicle is turned.

BACKGROUND OF THE INVENTION

As used in this specification and the claims, the term "center of draft" means the point in the vehicle which is substantially an equal distance from the farthest front and farthest rear contact points between parts of the vehicle and the surface of the ground, snow or the like upon which it is to be advanced. For example, with a tractor propelled by a pair of moving tracks, the center of draft is substantially equidistant from the foremost and rearmost cleats of the tracks and also substantially equidistant between the longitudinal centerlines of the tracks when the vehicle is viewed from the top. With a four wheel type vehicle, the center of draft is substantially an equal distance from the points where the tires contact the ground, or other surface and also substantially equidistant between longitudinal lines through the treads of the tires when viewed from the top. With a single track vehicle such as a snowmobile, the center of draft is substantially equidistant between the foremost and rearmost cleats of the track and also substantially at the longitudinal centerline of the track when viewed from the top.

When a device such as a snow roller, harrow or the like is drawn behind a vehicle which is provided with any of the prior art hitches of which I am aware, as the vehicle is turned by manipulation of the steering wheel or actuation of the power steering devices, the friction between the drawn device and the surface with which it is in contact causes a force to be exerted about the center of draft of the vehicle in a lateral direction opposite to the direction in which the vehicle is being turned so that the turning force exerted by the operator upon the steering wheel or by the steering devices must be increased to overcome this opposing, dragging force exerted by the device which is being drawn. The magnitude of the lateral force which is thus exerted by the drawn device depends upon the magnitude of the force which it exerts against the ground or other surface with which it is in contact and also upon the distance between the point of the vehicle where this force is applied and the center of draft of the vehicle (the lever arm of the force).

The following United States patents relate to compactors, road grading machines, scraper drives and mountings, tractors and truck attachments for tractors:

| Patent No. | Inventor | Date |
| --- | --- | --- |
| 3,318,209 | Schultz | May 9, 1967 |
| 3,539,014 | Jonsson | November 10, 1970 |
| 3,059,714 | Johnson | October 23, 1962 |
| 1,296,022 | Townsend | March 4, 1919 |
| 1,397,053 | Mitchell | November 15, 1921 |

While the above patents disclose attempts to solve some of the problems solved by this invention, they do not solve them in the same way nor disclose the same combination of elements in their attempts to solve them as are used in this invention.

Accordingly, it is an object of this invention to provide a hitch for a vehicle which will not increase the force required to turn the vehicle whether it is being turned by a manual steering device, power steering device or other device.

Another object is to provide a hitch which may be used to reduce the force required to be exerted in turning the vehicle, i.e., one in which the device which is being drawn assists in turning the vehicle by the manual or power steering devices.

Still another object is to provide a hitch in which the effect of the device which is being drawn upon steering of the vehicle may be varied by the operator.

A still further object is to provide a hitch which permits steering the vehicle by the device which is being drawn without use of the customary manual or power steering devices.

Yet a further object is to provide a hitch which provides a more stable vehicle.

Another object is to provide such a hitch in which the force exerted by the device which is being drawn can be varied by the operator without interfering with the operator's ability to steer the vehicle by use of the manual or power steering devices.

Another object is to provide a hitch in which the device to be drawn comprises elongate means rotatable about a substantially horizontal axis with its arcuate periphery in contact with the surface upon which it is moved and which is driven by substantially vertical drive means located in a substantially vertical pivot means and driven by the means for driving the vehicle propelling means without intervening universal joints or the like.

Other objects are to provide a hitch which is strong, economical to manufacture and to install and easy to operate and to repair.

SUMMARY OF THE INVENTION

In accordance with one aspect of the invention, a substantially vertical pivot means is provided on the frame of the vehicle substantially at the center of draft of the vehicle, a forward hitch frame member is provided having its forward end mounted for rotation about the axis of the vertical pivot means and means is provided for guiding the forward hitch frame member for rotation about the axis of the vertical pivot means in a plane which is substantially normal to the axis of the vertical pivot means.

The plane in which the forward hitch member is rotatable is preferably above the uppermost parts of the tracks or wheels of the vehicle which are used to advance it relative to the surface of the ground or snow upon which it is propelled.

A supplemental hitch frame member is provided which extends downwardly and rearwardly from the forward hitch frame member to the locality where the device to be drawn is attached. The device to be drawn is attached so that the drawing force applied to it by the vehicle is applied at a point which is in a plane which substantially coincides with the axis of the vertical pivot and the longitudinal centerline of the forward hitch member when viewed from the top.

Consequently the force exerted by the device which is being drawn when the vehicle is turned by the manual operation of the steering wheel or the power actuated steering devices is exerted at the center of draft of the vehicle so it does not increase the force required by the operator or by the power steering devices to turn the vehicle. The vehicle is also more stable than if the vertical pivot were located substantially behind or ahead of the center of draft.

Furthermore, means such as hydraulic cylinders are provided which may be used by the operator to rotate the forward hitch frame member about the vertical pivot in either direction and when such means is used, the device which is being drawn assists the operator or the power steering devices in the steering operation. This means may also be used to steer the vehicle without use of the manual or power steering devices at all.

Preferably, the vertical pivot is also located near the center of gravity of the vehicle thereby providing even greater stability during turning operations.

According to the preferred embodiment, the guide means comprises at least one arcuate track member which is concentric with the axis of the vertical pivot and mounted on one of the vehicle and the forward hitch frame member and rollers which traverse the track member when the forward hitch frame member is rotated, thereby to maintain the hitch frame member in a plane which is substantially normal to the axis of the vertical pivot during rotary movement about it.

In addition, I prefer to provide supplemental hitch frame member means which extends downwardly and rearwardly from the rear end of the forward hitch frame member and the device to be drawn is attached to this supplemental hitch frame member in such a way that the force exerted by the device to be drawn is applied in the plane which substantially coincides with the axis of the vertical pivot and said longitudinal centerline of the forward hitch frame member.

According to a preferred embodiment, substantially horizontal pivot means is provided on the supplemental hitch frame member with its axis in a plane which is substantially normal to the longitudinal centerline of the forward frame member when viewed from the top. Rear frame member means is provided which has its forward end mounted for rotation about the horizontal pivot means and has means for attachment to the device to be drawn adjacent to its rear end. Means for rotating the rear frame member about the horizontal pivot means is provided, such as a hydraulic cylinder controlled by the operator, so that the elevation of the means for attachment to the drawn device relative to the surface of the snow or the ground may be varied thereby increasing or decreasing the pressure between it and the ground and varying the magnitude of the force or drag exerted by it in opposition to the normal turning movement of the vehicle by the manual or power steering means or exerted by it in aid of the turning movement when the forward hitch frame member is positively rotated about the vertical pivot by the hydraulic cylinders attached to it.

According to another preferred embodiment which is the subject of this application, the vertical pivot is hollow and rotatably receives a vertical shaft which is driven from the engine of the vehicle by an input shaft and a pair of 90° gears one attached to the input shaft and the other to the lower end of the vertical shaft. A power output shaft 107 has one end connected to the element for actuating the device which is being drawn and its other end driven by the vertical shaft 106 by a pair of 90° gears, one, 110, attached to the end of the power output shaft and the other, 111, attached to the upper end of the vertical shaft. No universal joints are used in the vertical shaft, nor the input shaft, nor in the attachment of the hollow substantially vertical pivot to the vehicle. With this embodiment, the axis of the power output shaft may be located in a plane which substantially coincides with the axis of the vertical pivot and the longitudinal centerline of the forward hitch frame member.

DESCRIPTION OF THE DRAWINGS

FIG. 1 is a perspective view of a track tractor having a hitch made in accordance with this invention installed thereupon and three snow rollers attached to the hitch;

FIG. 5 is an enlarged section taken on the line 5—5 of FIG. 2;

FIG. 6 is a section like FIG. 5 but on a reduced scale showing two sets of ninety degree gears, the vertical drive shaft, the output shaft and the input shaft.

DESCRIPTION OF THE EMBODIMENTS SHOWN IN THE DRAWINGS

Figure 2:
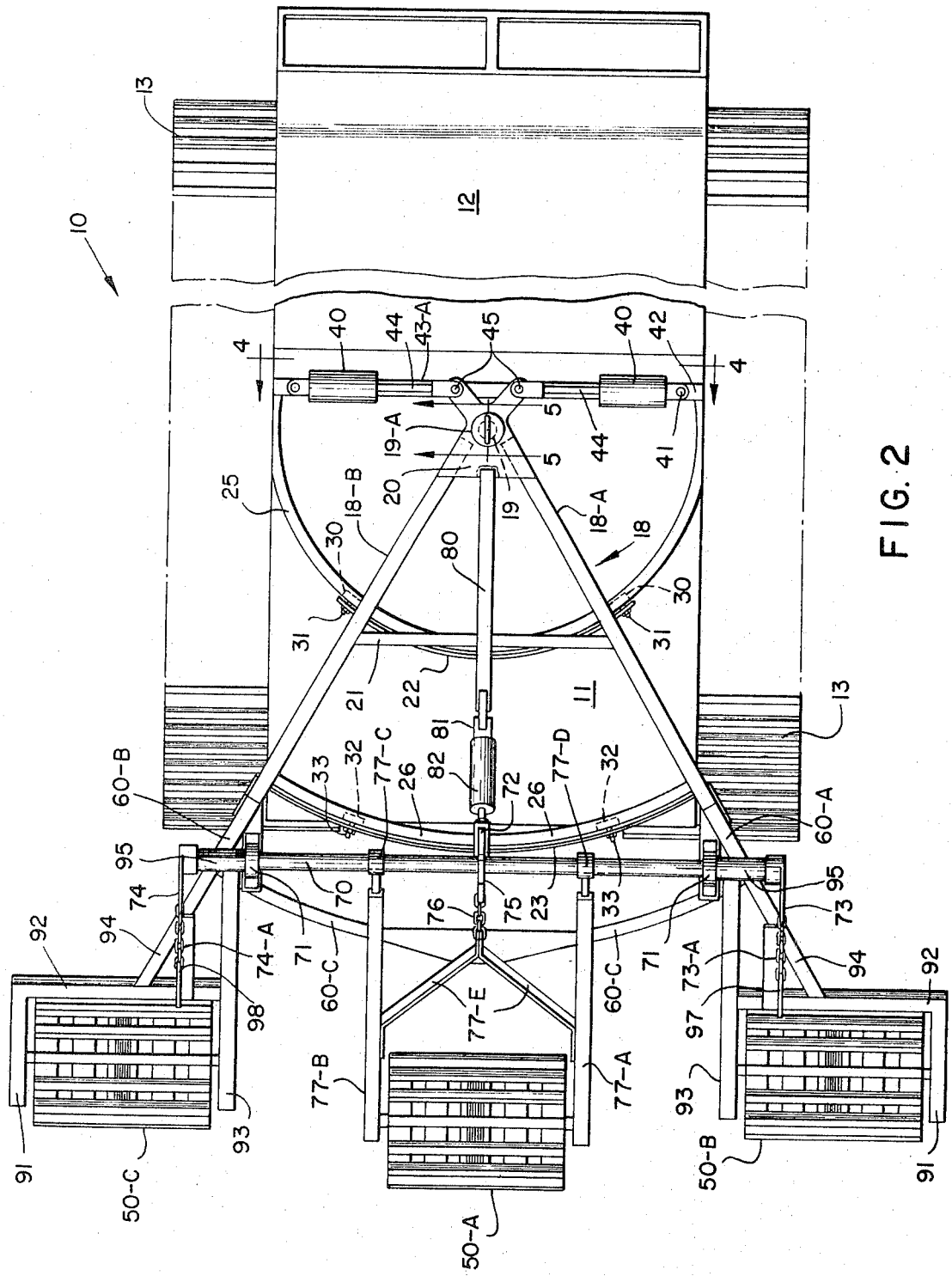
FIG. 2 is a plan of FIG. 1 with the tractor broken away behind the cab.

The track tractor 10 includes a vehicle frame member 11, cab 12, tracks 13 and sprockets 14 which are rotated by means driven by the vehicle engine (not shown) thereby to rotate the tracks in contact with the surface upon which the vehicle is to be moved.

A vertical pivot member 15 (FIG. 5) is secured to the frame member 11 by the collar 16 which is welded to the frame member.

A forward hitch frame member 18 includes two substantially horizontal arms 18-A and 18-B which diverge rearwardly from the bearing member 19. The bearing member 19 is welded to the plate member 20 which is secured to the arms 18-A and 18-B so that the bearing member 19, plate member 20 and arms 18-A and 18-B are free to rotate as a unit about the vertical pivot 15. The cap member 19-A is integral with the bearing member 19 and its ring 19-B can be used to remove the forward frame member 18 and bearing member 19 from the vertical pivot means 15 for lubrication or repair.

The arms 18-A and 18-B are held in spaced relationship by the cross frame member 21 and the arcuate frame members 22 and 23.

Track members 25 and 26 of U-shaped cross section are secured to the vehicle frame member 11 and when viewed from the top as in FIG. 2, they are concentric with the axis of the bearing member 19 and the vertical pivot 15.

Rollers 30 (FIG. 2) are rotatably mounted on bolts 31 which are secured to arcuate frame member 22 and these rollers traverse the U-shaped channel of track member 25 when the forward hitch frame member 18 is rotated in either direction about the vertical pivot member 15.

Rollers (FIG. 2) are rotatably mounted on bolts 33 which are secured to the other arcuate frame member 23 and these rollers traverse the channel of the track member 26 when the frame member 18 is rotated in either direction about the vertical pivot member 15.

Thus the rollers and track members guide the forward hitch frame member 18 in a plane which is normal to the axis of the vertical pivot 15 as it is rotated about the vertical pivot.

Hydraulic cylinders 40 are pivotally secured at 41 to plates 42 which extend inwardly from the members 43 which are attached to the channel member 43-A which is on the vehicle frame 11. Rams 44 of cylinders 40 are pivotally attached at 45 to the forwardly extending portions of the plate 20.

Hydraulic lines (not shown) lead respectively from the ram and piston ends of the cylinders 40 through a control valve (not shown) to a source of fluid under pressure and a fluid reservoir. By actuation of the manual lever of the control valve (not shown), the operator can cause the rams 40 to rotate the forward hitch member 18 about the vertical pivot 15 in either direction in a plane which is substantially normal to the axis of the vertical pivot member and during such movement this frame member is stabilized by the rollers 30 and 32 acting in the arcuate track members 25 and 26.

When this hydraulic rotation of the forward hitch frame member is used, the force necessary to turn the vehicle by manual or power steering is reduced or entirely elliminated as described in more detail below.

By activation of another manual control (not shown), the operator can establish a free flow of oil to and from the cylinders so that when the vehicle is turned in one direction by manual turning of the steering wheel (not shown) or by power steering devices (not shown), the forward hitch frame member will rotate or float in the opposite direction moving about the pivot 15, such rotation being caused by the friction between the snow rollers 50-A, 50-B and 50-C and the surface of the snow by turning of the vehicle about its center of draft. Consequently, the snow rollers do not interfere with or make manual or power steering harder when this circuit for the oil is established. However, when the forward hitch frame member 18 is rotated by the rams, the vehicle can be either steered by the friction between the drawn device and the surface of the snow without use of the steering wheel or normal power steering devices or this friction can be used to reduce the force necessary to be exerted in turning of the steering wheel or by the power steering devices.

It will be noted that the vertical pivot 15 is located substantially at the center of draft of the vehicle (as defined above). It will be noted that the forward hitch frame member 18 is rotated in a plane which is above the uppermost parts of the tracks 13 and consequently the swinging of the direction of the centerline of draft is not restricted by the distance between the tracks or wheels.

The supplemental frame members 60-A and 60-B extend downwardly and rearwardly from the frame members 18-A and 18-B preferably at an angle of about 45° and their lower ends are connected together by the arcuate member 60-C. One, two or three conventional hitch elements (not shown) may be mounted on the member 60-C for attachment to a device or devices to be drawn.

Instead of using the conventional hitch elements on the arcuate member 60-C in accordance with a preferred embodiment of my invention, I use a hitch means with which the elevation of the device to be drawn can be adjusted relative to the surface which it contacts. This improved hitch means includes a substantially horizontal pivot means formed by the rod 70 which extends through bearings in the members 71 which project upwardly and rearwardly from the supplemental frame members 60-A and 60-B. Lever elements 72, 73 and 74 are secured to the horizontal pivot member 70. The rearwardly projecting arm 75 is secured to the central level 72.

The snow roller 50-A is rotatably secured between the rear ends of the arms 77-A and 77-B. The forward ends of the arms 77-A, 77-B are rotatably secured to the horizontal bar 70 by bearings 77-C and 77-D (FIG. 2). The chain 76 interconnects arm 75 and the upper ends of the frame members 77-E. The lower ends of the frame members 77-E are secured to the frame members 77-A and 77-B.

Figure 3:
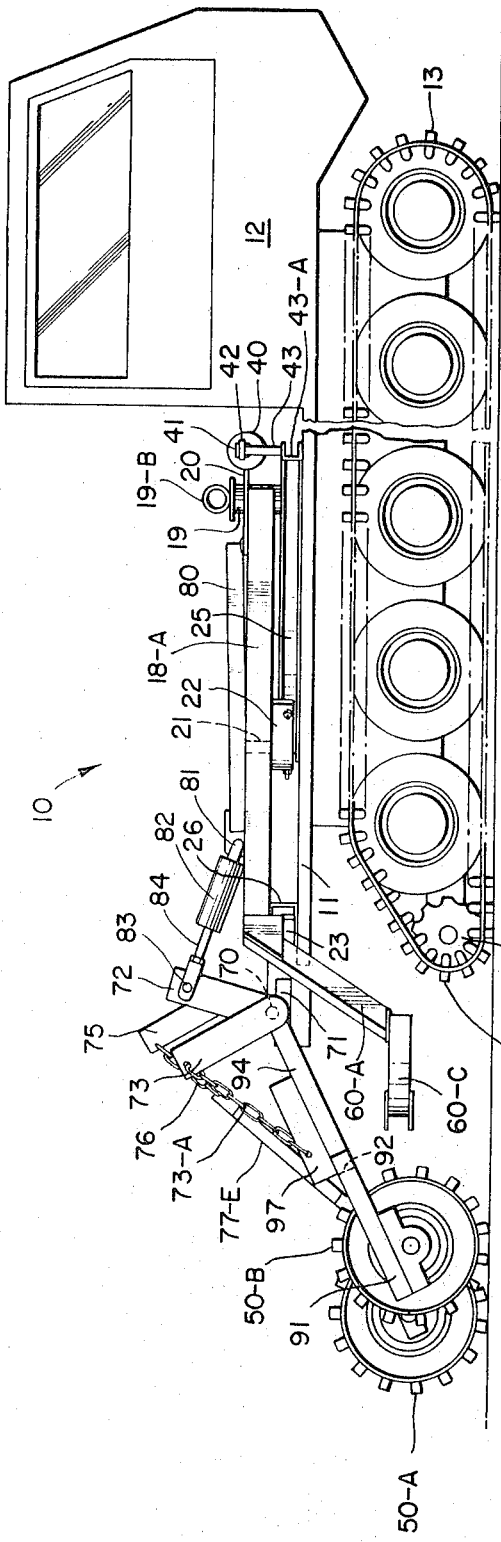
FIG. 3 is a side elevation of FIG. 1 with the tractor broken away behind the cab.
Figure 4:
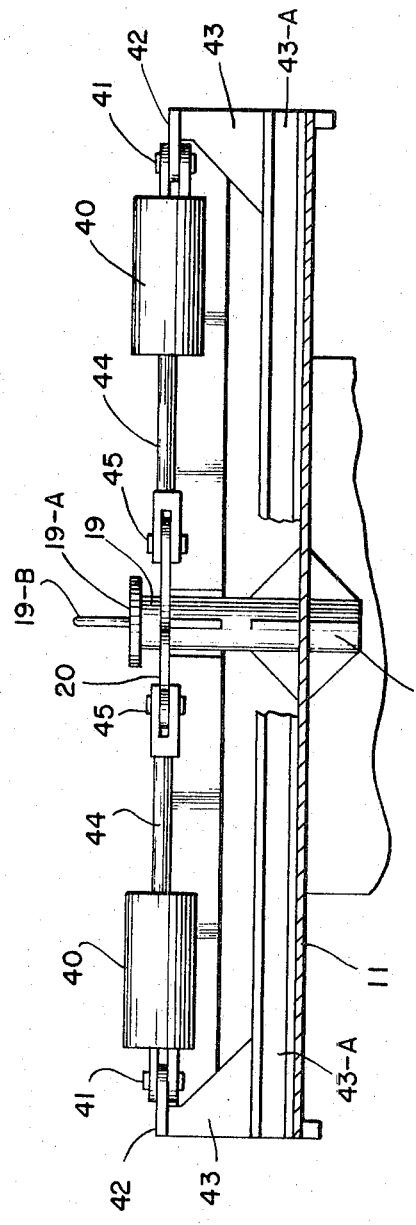
FIG. 4 is an enlarged section taken on the line 4—4 of FIG. 2.
Figure 8:
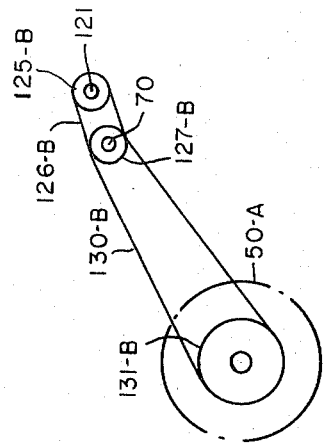
FIG. 8 is a diagrammatic section taken on the line 8—8 of FIG. 7.

The forward end of the arm 80 is secured to the plate 20, an intermediate portion is secured to the cross frame member 21, and its rear end is pivotally secured at 81 to the hydraulic cylinder 82. The ram 84 of this hydraulic cylinder is pivotally secured to the member 72 at 83. Hydraulic lines (not shown) lead from the ram and piston ends of the cylinder 83 respectively through a control valve (not shown) to a source of fluid under pressure and a fluid reservoir (not shown). By actuation of a manual control lever at the control valve in one direction, the operator can cause the ram of the hydraulic cylinder to rotate the elements 72 and 75 and the horizontal rod or pivot 70 clockwise (looking at FIG. 3) and the chain 76 through frame elements 77-E, 77-A 77-B elevates the axis of the roller 50-A so that it exerts less pressure against the snow surface. This reduces the upward force exerted by the drawn device upon the forward end of the tractor which tends to reduce the pressure exerted by the forward portions of the tracks against the snow surface. It also reduces the pressure exerted by the roller 50-A against the snow surface and the steering effect of the roller.

When the operator actuates the control lever to cause the ram of cylinder 82 to be moved in the other direction, slack can be created in the chain 76 so that the entire weight of the roller 50-A acts upon the snow surface.

The chain may be replaced by a rod or other connecting member so that when the roller or other drawn device is moved towards the snow or other surface positive pressure will be exerted upon it to cause it to exert a greater force against the surface than that of its own weight.

The snow rollers 50-B and 50-C are mounted for rotation in identical frames formed by frame elements 91, 92, 93 and 94, elements 93 and 94 being rotatably mounted on the horizontal pivot bar 70 at their forward ends by bearings 95. Chains 73-A and 74-A interconnect levers 73 and 74 with elements 97 and 98 respectively. Elements 97 and 98 are attached to frame elements 92.

Accordingly, when the ram of cylinder 82 is actuated to rotate the horizontal pivot bar 70 in its bearings 71, the lever elements 73 and 74 are rotated and the chains 73-A and 74-A either elevate or lower the rollers 50-B and 50-C relative to the snow surface and, as in the case of roller 50-A, the forces exerted upon the forward end of the vehicle and upon the snow surface are varied accordingly.

The lines of draft of snow rollers 50-B and 50-C are parallel to the line of draft of the snow roller 50-A.

Referring to FIG. 6, the input shaft 100 may be driven by the transmission (not shown) of the vehicle. It extends through a bearing 101 in the wall of the gear box 102 which is supported by the vehicle frame member 11 by means of bolts 103. Gear 104 attached to the input shaft meshes with gear 105 attached to the lower end of the vertical shaft 106 which is rotatably received in the bore of vertical pivot member 15.

Power output shaft 107 has its rear end connected to an element for actuating the device which is being drawn (not shown in FIG. 6) and its other end extends through the bearing 108 in the wall of the gear box 109. Gear 110 is attached to the end of the power output shaft 107 and it meshes with gear 111 which is attached to the upper end of the vertical shaft 106. Consequently, the output shaft 107 is driven by the input shaft 100 and the vertical shaft 106 through the 90° gears 104, 105 110 and 111 without the use of universal joints in the input shaft. It is also to be noted that the substantially vertical pivot 15 is attached to the frame of the vehicle 11 and that the arcuate track means guide the frame member 18 for rotation about the axis of the vertical pivot in a plane which is substantially normal to said axis and that no universal joints are used in the attachment of the substantially vertical pivot to the vehicle.

Figure 7:
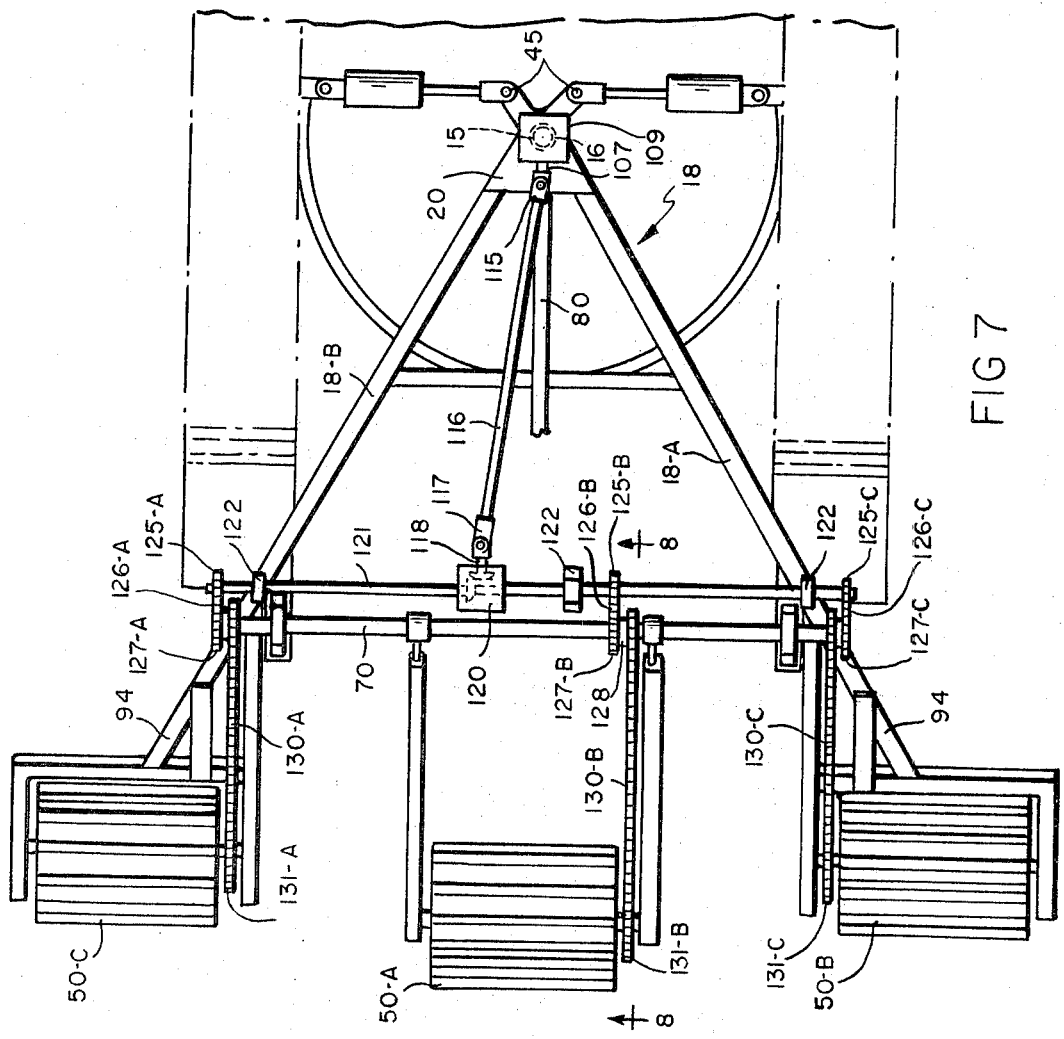
FIG. 7 is a plan view like FIG. 2 with parts broken away but showing means for connecting the output shaft to means for driving the snow rollers.

The output shaft 107 is located in a plane which substantially coincides with the axis of the vertical pivot 15 and the longitudinal centerline of the forward hitch frame member when viewed from the top as in FIGS. 2 and 7.

The end of the output shaft 107 (FIGS. 6 and 7) is attached by universal joint 115 to one end of the drive shaft 116. The other end of this drive shaft is attached by universal joint 117 to an input shaft 118 of one of a pair of ninety degree gears (shown dotted in FIG. 7) which are located in the gear box 120. The drive shaft 121 is supported from the hitch frame members in three bearings 122. Drive shaft 121 is attached to the second gear of said pair of 90° gears. Consequently, drive shaft 121 is rotated by the output shaft 107, drive shaft 116, input shaft 118 and said pair of 90° gears.

Figure 9:
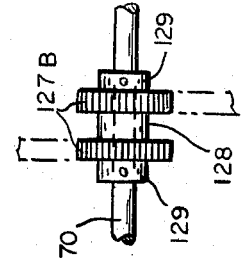
FIG. 9 is an enlarged plan view of one of the idler sprockets.

Drive sprockets 125-A, 125-B and 125-C are attached to the drive shaft 121 and they drive endless chains 126-A, 126-B and 126-C which in turn drive idler sprockets 127-A, 127-B and 127-C. Each idler sprocket consists of a tubular member 128 (FIG. 9) which is rotatably supported on the rod 70 between the collars 129 which are secured to the rod. The axles of the rollers 50-A, 50-B and 50-C are driven by endless chains 130-A, 130-B and 130-C which pass over the idler sprockets 127-A, 127-B and 127-C and the sprockets 131-A, 131-B and 131-C which are secured to the axles of the rollers.

The same arrangement may be used to drive other devices to be drawn by the vehicle such as roto tillers, mowing machines, etc.

While I have shown the load transferring hitch used with a track tractor, it is apparent that it may be used with a vehicle which is propelled by wheels or by a single track such as a snowmobile.

While the load transferring hitch has been shown with devices for rolling or grooming snow, it may be used with all types of devices which comprise elongate means rotatable about an axis with its arcuate periphery in contact with the surface upon which it is moved such as harrows, roto tillers, mowing machines and other implements for use with earth or other types of surfaces.

It will be understood that the specific embodiments of this invention which are disclosed herein are of a descriptive rather than a limiting nature and that various changes, combinations, substitutions, additions and modifications may be made in accordance with the foregoing teachings without departing in spirit or scope from the broader aspects of the invention.

I claim:

1. In apparatus of the character described, a vehicle, a device to be drawn thereby, a frame member for connecting the vehicle and the device to be drawn, said vehicle comprising means for propelling it which includes means for rotation in contact with the surface upon which it is moved and means for driving said propelling means, hollow substantially vertical pivot means attached to said vehicle without universal joints and located substantially at its center of draft, said device to be drawn comprising elongate means rotatable about an axis with its arcuate periphery in contact with the surface upon which it is moved, means for mounting the forward end of said frame member for rotation about the axis of said substantially vertical pivot means, substantially vertical drive means rotatably positioned in said substantially vertical pivot means, means for driving said substantially vertical drive means from said means for driving the vehicle propelling means, power output means connected to the upper end of said substantially vertical drive means and means for rotating the device to be drawn connected to said power output means, said means for rotating the device to be drawn comprising a first drive shaft connected to said power output means and extending longitudinally of the frame member, a second drive shaft extending transversely of the frame member, means for rotating the second drive shaft from the first drive shaft and means for rotating said elongate means from said second drive shaft, said means for rotating said elongate means comprising rod means extending transversely of the vehicle, idler sprocket means rotatably mounted on said rod means and means for driving said elongate means operatively connnected to said idler sprocket means.

2. Apparatus according to claim 1 also including sprocket means attached to said second drive shaft and means for driving said idler sprocket means connected between said sprocket means and said idler sprocket means.

3. In apparatus of the character described, a vehicle, a device to be drawn thereby, a frame member for connecting the vehicle and the device to be drawn, said vehicle comprising means for propelling it which includes means for rotation in contact with the surface upon which it is moved and means for driving said propelling means, hollow substantially vertical pivot means attached to said vehicle without universal joints and located substantially at its center of draft, said device to be drawn comprising elongate means rotatable about an axis with its arcuate periphery in contact with the surface upon which it is moved, means for mounting the forward end of said frame member for rotation about the axis of said substantially vertical pivot means, substantially vertical drive means rotatably positioned in said substantially vertical pivot means, means for driving said substantially vertical drive means from said means for driving the vehicle propelling means, power output means connected to the upper end of said substantially vertical drive means and means for rotating the device to be drawn connected to said power output means, said means for rotating the device to be drawn comprising a first drive shaft connected to said power output means and extending longitudinally of the frame member, a second drive shaft extending transversely of the frame member, means for rotating the second drive shaft from the first drive shaft and means for rotating said elongate means from said second drive shaft, said means for rotating the second drive shaft comprising a pair of meshing gears, one connected to said first drive shaft and the other connected to said second drive shaft.

* * * * *